United States Patent [19]

Lowther et al.

[11] Patent Number: 4,751,412

[45] Date of Patent: Jun. 14, 1988

[54] DYNAMOELECTRIC MACHINE WITH CAM LOCKED AIR GAP BAFFLE ASSEMBLY

[75] Inventors: Gary R. Lowther, Casselberry; Warren W. Jones, Oviedo, both of Fla.

[73] Assignee: Westinghouse Electric Corp., Pittsburgh, Pa.

[21] Appl. No.: 20,041

[22] Filed: Feb. 27, 1987

[51] Int. Cl.$^4$ .............................................. H02K 9/00
[52] U.S. Cl. ......................................... 310/52; 310/42; 310/53; 310/55; 310/59
[58] Field of Search ..................... 310/52, 53, 55, 57, 310/58, 59, 60 R, 62, 63, 64, 65, 91, 214, 42

[56] References Cited

U.S. PATENT DOCUMENTS

| | | | |
|---|---|---|---|
| 3,110,827 | 11/1963 | Baudry | 310/55 |
| 3,265,912 | 8/1966 | Baudry | 310/59 |
| 4,315,173 | 2/1982 | Calfo et al. | 310/53 |

*Primary Examiner*—R. Skudy

[57] ABSTRACT

A cam locked air gap baffle assembly and method of installing same within a stator of a large, gas-cooled dynamoelectric machine utilizes a plurality of segmented baffles spaced by insulated tubes. Each baffle segment includes a wedge portion with a rotatable cam which serves to expand the wedge portion against the stator slot thereby locking it in place.

16 Claims, 4 Drawing Sheets

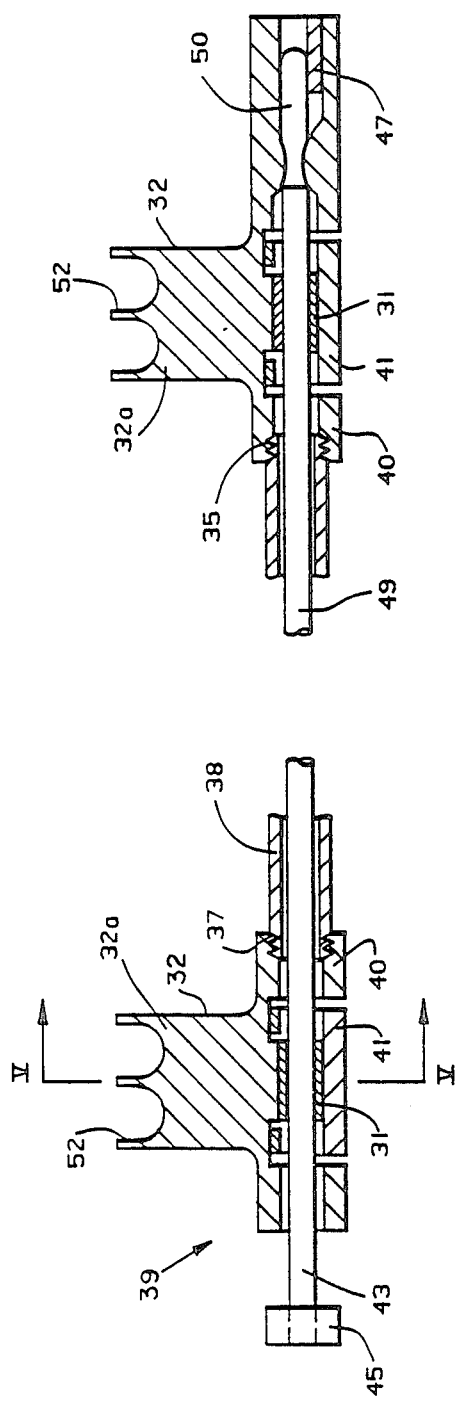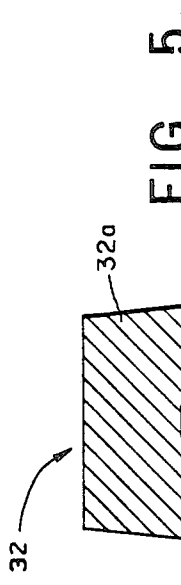
FIG. 4.
FIG. 5.

DYNAMOELECTRIC MACHINE WITH CAM LOCKED AIR GAP BAFFLE ASSEMBLY

BACKGROUND OF THE INVENTION

This invention relates generally to the ventilation of dynamoelectric machines, and more particularly to an improved method and apparatus for dividing the air gap formed between the stator and rotor of such machines transversely into a plurality of annular zones by baffle members.

Large turbine generators are usually of the inner cooled construction in which a coolant gas, usually hydrogen, is circulated through ducts in the stator and rotor slots in direct thermal relation with the current-carrying conductors inside the ground insulation. A machine of this type having an improved ventilation system is disclosed and claimed in U.S. Pat. No. 3,110,827, issued Nov. 12, 1963, to R. A. Baudry, assigned to the assignee of the present invention, and incorporated herein by reference.

As described in that patent, more effective cooling of a large turbine generator is obtained by dividing the air gap transversely into a plurality of annular zones by baffle members disposed in the air gap and mounted on the rotor and the stator core. Alternate zones are connected to the high pressure or discharge side of a blower mounted on the rotor shaft and the remaining zones are connected to the low pressure or entrance side of the blower. Radial ducts or passages in the rotor in each zone permit the coolant gas to flow from the high pressure zones to the low pressure zones through the longitudinal ducts of the rotor winding. Thus, the blower pressure is used to force the gas through the rotor ducts in a plurality of short axial paths so that adequate gas flow is obtained.

One of the problems in the design of such a machine is the provision of a suitable system of baffles in the air gap. Such a system must be capable of withstanding the variation and other forces occurring during operation of the machine and must be capable of operating at high temperatures in hydrogen. The baffle system must be such that it can be installed without difficulty and with close clearance between the stator and rotor baffles to minimize gas leakage between adjacent zones of the air gap. The rotor baffles may be rings of non-magnetic material shrunk-fit or otherwise secured on the rotor surface at appropriate places along the rotor. The stator baffles, on the other hand, are aligned radially with the rotor baffles and, because of the small clearance, at least part of these stator baffles should be removable and arranged so that they can be installed or removed with the rotor in place in the machine. This design is necessary to permit the rotor to be installed in the machine or removed therefrom by coventional procedures.

One prior art approach which addresses all of the requirements mentioned above is disclosed and claimed in U.S. Pat. No. 3,265,912, issued Aug. 9, 1966 to R. A. Baudry, assigned to the assignee of the present invention and incorporated hereinby reference. In that approach, a baffle system for the air gap of a dynamoelectric machine consists of rotating baffles and cooperating stationary baffles. A series of annular rotating baffles are positioned longitudinally along the rotor body to divide the air gap transversely into the pressure zones required by the cooling system. Annular stationary baffles are positioned along the bore of the stator core to align radially with the rotating baffles. Each stationary baffle ring comprises a plurality of segmented members each having a base disposed in a slot of the stator core. A complete baffle assembly, comprising a row of longitudinally spaced baffle segments with spacing members between them held together end wise by glass rope, is supported within each stator slot. The abutting ends of the spacers and the bases of the baffle segments are oppositely tapered in order that a compressive load, applied end-to-end and produced by a glass tape loop which extends from one end of the row to the other end under tension, will wedge the entire assembly in place. A baffle assembly is placed in each slot of the core, and the corresponding segments of the different baffle assemblies abut each other circumferentially of the core to form an annular baffle.

Another similar prior art approach utilizes tapered wedges on the nose of each barrier segment, two guide cables formed of glass rope epoxy to position the wedges, and a stainless steel tensioning cable which is tightened to lock the baffle segments in place by a suitable piston and block assembly. While both of the immediately above described approaches permit the installation or removal of baffles on the stator core with the rotor in place, each require unnecessarily complicated assembly methods which are prone to problems that eliminate the possibility of repair of replacement within the field. For example, the tape used in U.S. Pat. No. 3,265,912 has great strength but can be stretched a substantial amount thereby fostering the loss of sufficient compressive force to lock the baffle assembly in place. By virtue of its sheer number of components used, the other approach is prone to cable problems, tensioning problems caused by the piston and black assembly, and problems arising when the tapered wedges bind against one another. Such complicated devices must often be returned to the factory for repair.

SUMMARY OF THE INVENTION

Accordingly, it is a general object of the present invention to provide a dynamoelectric machine of the type described above which has a system of annular baffles in the air gap which meets all of the requirements mentioned and which can be readily installed.

More specifically, it is an object of the present invention to provide a baffle system for a machine of the type described which includes baffles on the stator core that can be installed on the stator or removed therefrom with the rotor in place in the machine.

Another object of the present invention is to provide a positive locking or retaining means for the baffles on the stator to insure satisfactory operation while subjected to generator core vibration during operation.

Still another object of the present invention is to provide a preassembled row of spaced baffle members which can be easily installed as a unit in a slot in the stator core of a dynamoelectric machine, and which forms a spaced series of annular baffles in cooperation with similar assemblies in the other slots.

Briefly, these and other objects of the present invention are accomplished by a cam locked air gap baffle assembly and method of installing same within a stator of a large, gas-cooled dynamoelectric machine. In accordance with a preferred embodiment of the present invention, a baffle system for the air gap of the dynamoelectric machine consists generally of rotating baffles and cooperating stationary baffles. As is conventional, the series of annular rotating baffles are positioned longitudinally along the rotor body to divide the air gap transversely into the pressure zones required by the cooling system. The rotating baffles are preferably nonmagnetic steel rings shrunk-fit on the rotor body. The cooperating stationary baffles comprise a plurality of baffles segments which are located in line axially with the rotating baffles. Spacing between the baffle segments of a particular baffle train arranged longitudinally in a stator slot is maintained by tube means made of insulated material have threaded ends which screw into the baffle segments. The number of tubes and baffle segments is determined by the number of cooling zones required in the particular dynamoelectric machine.

In accordance with one important aspect of the invention, each of the baffle segments are locked radially in place within the stator slot to the slot wedges through use of cam means attached to the underside of each baffle segment. The baffle segments of a particular baffle train are assembled prior to their insertion in the stator slot by joining a pair of baffle segments together with their respective spacer means. Thereafter, the assembled baffle train is inserted in the stator slot with a tool inserted axially through each of the cam means. Once positioned, the baffle train is locked in place by rotating the tool and with it each of the cam means. Additional axial locking may be provided by interlocking the first baffle circle corresponding to a single rotating baffle at one end of the machine. Furthermore, a bayonet assembly may be utilized in accordance with the preferred embodiment to prevent movement of the cams after locking.

The above and other objects, advantages, and novel features of the present invention will become apparent from the following detailed description of the preferred embodiment when considered in conjunction with the accompanying drawings wherein:

BRIEF DESCRIPTION OF THE DRAWINGS

FIG. 4 is an enlarged sectional view of the baffle segments shown in FIG. 2;

FIG. 5 is a sectional view of a baffle segment taken along the line V—V in FIG. 4.

DETAILED DESCRIPTION OF THE PREFERRED EMBODIMENT

Figure 1:
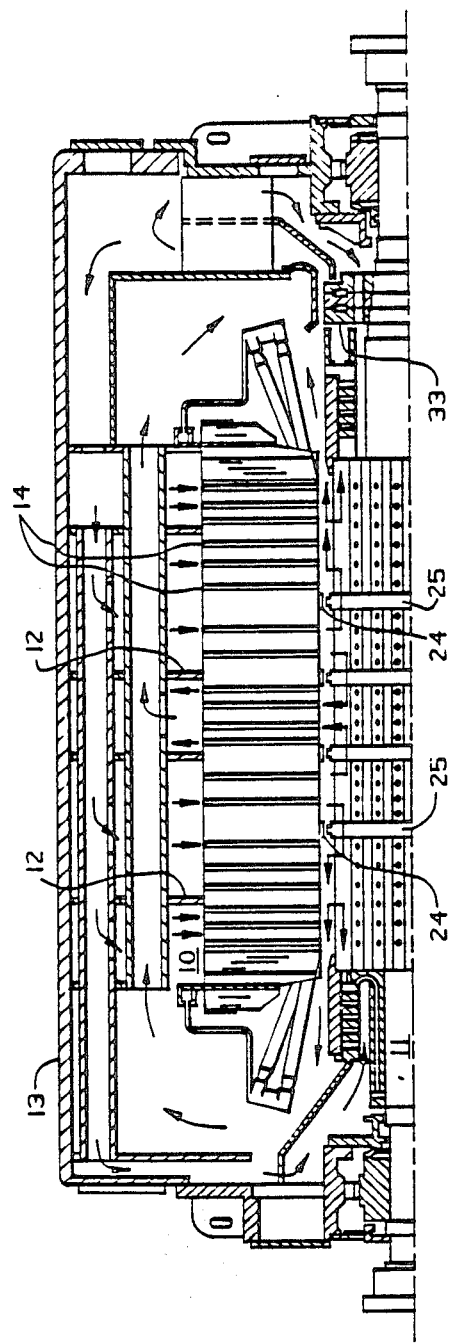
FIG. 1 is a sectional view of the upper half of a dynamoelectric machine embodying principles of the present invention.

Referring now to the drawings, wherein like characters designate like or corresponding parts throughout the several views, there is shown in FIG. 1 a dynamoelectric machine comprising a stator core 10 and a rotor 11. The stator core 10 is supported by frame rings 12 in a substantially gas-tight outer housing 13. The stator core 10, as is conventional, is a laminated annular core of the usual type having a cylindrical bore therethrough. The core 10 is built up of laminations arranged in spaced stacks to provide radial vent ducts 14 between them. The laminations of the core are clamped between suitable end plates in the usual manner. Further details of such a dynamoelectric machine are covered in detail within the above-referenced U.S. Pat. No. 3,265,912.

As disclosed in U.S. Pat. No. 3,265,912, the stator core 10 is provided with longitudinal slots 15 (FIG. 2) in its inner periphery for the reception of a stator winding which may be of any suitable type and may consist generally of a plurality of half coils connected at their ends to form the winding. This stator winding is of the inner cooled construction and each half coil consists of two stacks of conductor strands which are lightweight, insulated and transposed in the usual manner, and which are separated by ducts of high resistance metal which are lightly insulated from each other and from the conductor strands. The ducts extends longitudinally from one end to the other of the half coil for circulation of a coolant fluid in close thermal relation to the conductor strand. The half coil is enclosed in a heavy sheath of insulation to provide the necessary high voltage insulation to ground. Two half coils are often placed in each slot of the stator core and the slots are closed by suitable wedges. The ducts extend out of the coils at the ends and coolant fluid may be circulated through them in a closed recirculating system, as described in the above-mentioned U.S. Pat. No. 3,110,827, or in any other desired manner.

The rotor 11 is disposed in the bore of the stator core 10 and separated from the stator by an annular air gap. As is conventional, the rotor 11 is supported in bearings mounted in the ends of the housing 13, and means such as gland seals may be provided to prevent leakage of gas from the housing 13 along the shaft. The rotor 11 is also provided with longitudinal slots in its periphery for the reception of a field winding, the conductors of which extend longitudinally of the rotor and have circumferentially extending end turn portions which are supported against centrifugal forces by retaining rings 27 (FIG. 2) of usual construction.

As previously stated, the housing 13 of the machine is made as nearly gas-tight as possible, and is sealed at the points where the rotor shaft passes through it by means such as gland seals. The housing is filled with a suitable coolant gas, preferably hydrogen, which is utilized for cooling the rotor and the stator core. A blower 33 is mounted on the rotor shaft adjacent one end of the machine for circulating the gas therethrough. The blower 33 may be of any suitable type, such as a multistage blower of the axial flow type as shown in the drawing. The gas in the machine is maintained at a suitable static pressure, which may for example, be from 30 to 75 lbs. per square inch above atmospheric pressure. As such, the blower 33 develops sufficient differential pressure to maintain the desired circulation of gas within the housing 13 and through the various ducts in the manner described hereinafter.

Figure 2:
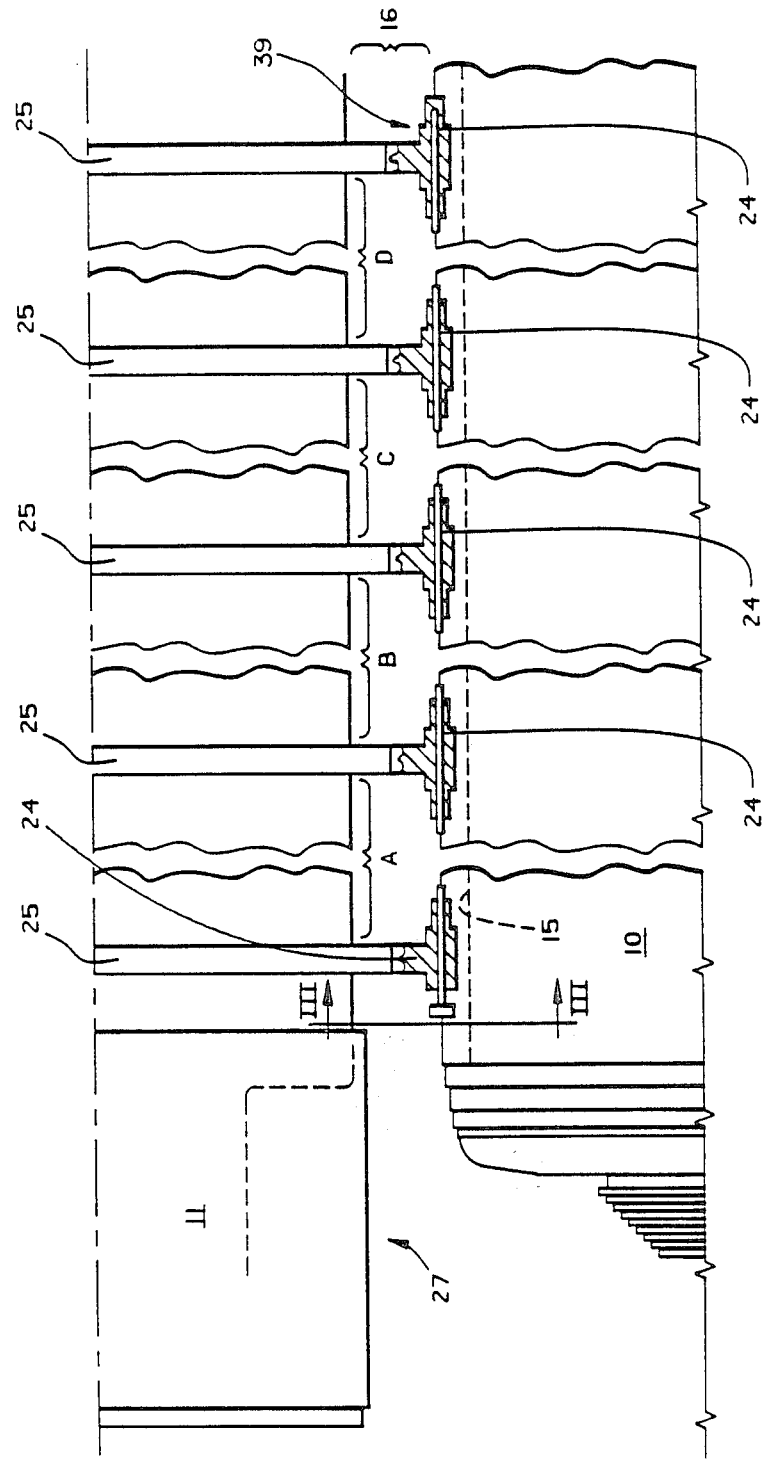
FIG. 2 is an enlarged fragmentary view, partly in section, of a portion of the lower half of the machine shown in FIG. 1.
Figure 6A:
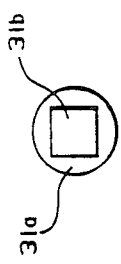
FIGS. 6A–6D illustrate details of the baffle segment shown in FIGS. 4 and 5.
Figure 6B:
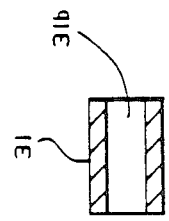
Figure 6D:
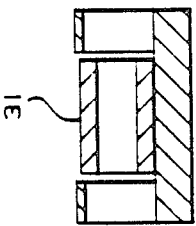

As more fully described in U.S. Pat. No. 3,110,827, adequate gas flow through the ducts of the rotor winding is obtained by dividing the path of the gas through the ducts into a plurality of relatively short longitudinal paths, and the pressure of the blower 33 is utilized to cause the gas to flow through these short paths. For this purpose, the air gap is divided transversely into a plurality of annular zones A, B, C, and D (FIG. 2). This is done by means of annular baffle members placed in the air gap and extending around the bore of the stator to form the annular zones. Adjacent zones are maintained at different gas pressures to cause the gas to flow from one zone to the next through the rotor ducts.

Referring now to FIG. 2, a plurality of annular baffles 24 are mounted on the stator core and corresponding annular baffles 25 are mounted on the periphery of the rotor. The rotating baffles 25 may be non-magnetic steel rings shrunk-fit the rotor body and, if desired, locked in place by any suitable means. The structure of the stationary baffles 24 will be described more fully hereinafter. The baffles 24 and 25 are radially aligned with each other with a small running clearance between the stator and rotor baffles. Thus, the baffles 24 and 25 divide the air gap 16 transversely into a plurality of annular zones, four such zones being shown.

In order to minimize leakage of gas directly between adjacent zones of the air gap, the clearance between the stationary baffles 24 and the rotating baffles 25 must be made quite small. Provision must be made, however, for installing the rotor in the machine without damaging the baffles, and for removing the rotor if necessary. For this reason, the stator baffles 24 are so designed that they can be installed after the rotor is in place, and are easily removably, at least at the bottom of the core, to permit a skid to be inserted. Thus, the rotor can be installed or removed by the usual procedures without interference from the baffles and without risk of damage to the baffles.

Figure 3:
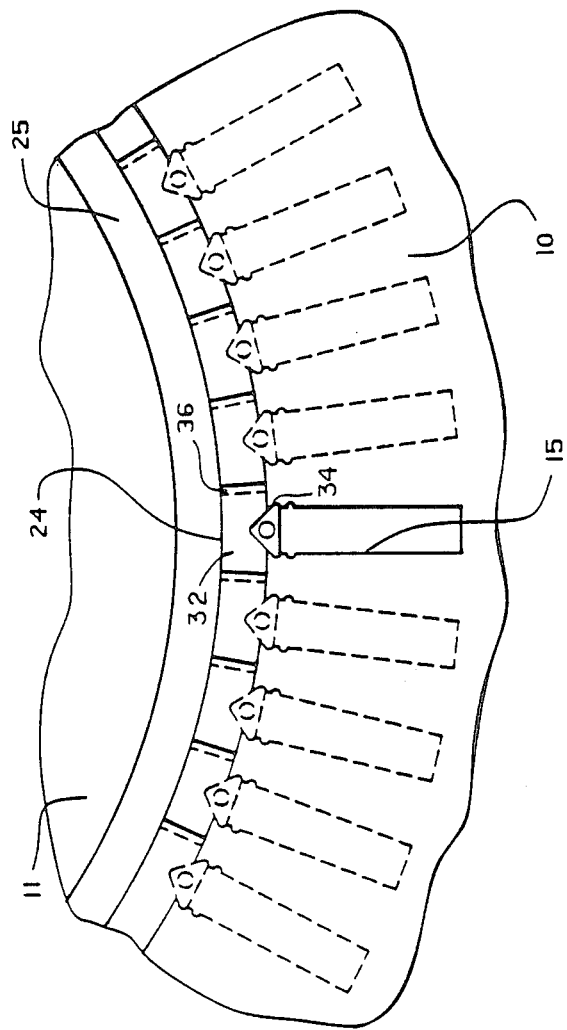
FIG. 3 is a sectional view from the exciter end of the stator core, taken along the line III—III in FIG. 2.
Figure 6C:
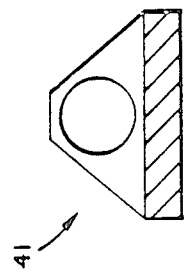

As shown in FIG. 3-5, each of the stator baffles 24 consist of a plurality of baffle segments 32 each having a vane portin 32a and a wedge portion 34 for insertion into one of the stator core slots 15. The segments 32 of each stationary baffle 24 abut each other circumferentially about the stator core to form a complete annular baffle. Any suitable interlocking means, such as a dovetail 36 between abutting baffle segments 32, may be used to lock a baffle 24 axially in place. With reference now to FIGS. 2 and 4, it can be seen that each stator core slot 15 supports a baffle train 39 comprising a plurality of longitudinally spaced baffle segments 32 with tubular spacer members 38 disposed between the bases 40 of each of the segments 32. Each of the segments 32 further include rotatable cam means, such as a square tubular cam 31 having a generally oblong-shaped cross section 31a with a square bore 31b formed therethrough, (FIGS. 6A-6D) wherein the cam 31 is adapted for rotation within the base 40 in order to expand its wedge 41 and lock the segment 32 in place. The number of segments in each stationary baffle ring is thus equal to the number of stator core slots 15.

In order to install a baffle train 39 in accordance with the present invention, each of the segments 32 have formed at either end means of couple them to the spacer members 38. For example, as shown in FIG. 4, the segments 32 have interior threads 35 which are adapted to mate with exterior threads 37 formed at either end of the spacer members 38. Once a complete baffle train 39 is assembled, it may be inserted as a unit within its respective slot 15. Thereafter, a square tool 43 having a knob 45 is inserted through the cams 31 of each segment 32, the tool 43 is turned thereby rotating the cams 31 together, expanding their wedges 41 to lock the baffle train 33 within the slot 15. In accordance with another important aspect of the invention, additional axial locking may be provided by interlocking one baffle circle, such as by dovetails 36 (FIG. 3) formed along the edges of the segments 32. Furthermore, additional interlocking may be provided by installing a bayonet assembly, such as a glass spring lock 47 (FIG. 4), to a segment 32 at one end of the train 39. After the cams 31 are rotated to their locked position, the tool 43 is removed and replaced with a similarly shaped bayonet rod 49 having an end portion 50 formed to engage the spring lock 47.

The baffle segments 32 should be made of material capable of withstanding continuous operation at temperatures of the order of 80° C. in a hydrogen atmosphere. Furthermore, the baffle segments 32 should be made from a non-metallic material in order to prevent excessive eddy current heating, and should have low moisture absorption, creepage rate and shrinkage. Glass melamine or glass epoxy are suitable materials for fabricated and machined baffle segments 32 or any of a number of available glass fiber filled resins can be used if the segments are molded. In a preferred embodiment of the present invention, the baffle segments 32 are formed of a substantially rigid insulating material such as "Micarta", and include, at their vane portion 32a, serrated tip portions 52 forming a labyrinth seal. The spacer member 38 may be composed of similar materials such as glass epoxy.

Obviously, many modifications and variations of the present invention are possible in light of the above teachings. It is therefore to be understood that within the scope of the appended claims, the invention may be practiced otherwise than as specifically described.

We claim as our invention:

1. A dynamoelectric machine, comprising:
   a substantially airtight casing adapted to be filled with a cooling gas;
   stator core disposed within said casing, said stator core including a cylindrical bore therethrough with a plurality of longitudinal slots formed therein;
   a rotor centrally disposed on a shaft for rotation within said bore thereby forming an air gap between said rotor and said stator core;
   a plurality of annular baffles attached to said rotor within said air gap thereby defining a plurality of gas zones;
   a plurality of baffle segments adapted for insertion within said slots;
   means for spacing said segments in a relationship within said slots corresponding to each said annular baffles; and
   cam means coupled to said segments for locking said segments axially with respect to said annular baffles.

2. The machine according to claim 1, wherein each said segment further comprises means for coupling thereto said spacing means.

3. The machine according to claim 2, wherein said coupling means comprises interior threads formed within said segment.

4. The machine according to claim 3, wherein said spacing means comprises a non-metallic tube, said tube having exterior threads formed at either end for engagement with said interior threads.

5. The machine according to claim 4, wherein said tube comprises a glass epoxy.

6. The machine according to claim 1, wherein said segments each comprises:
   a stationary member adapted to extend transversely across a respective one of said slots; and
   wedge means attached perpendicularly across said member at its bottom, said wedge means being expandable within said slots for engagement therewith.

7. The machine according to claim 6, wherein said wedge means comprises:

a first portion having a bore of predetermined diameter extending longitudinally therethrough, said first portion attached on one side of said stationary member;

a second portion attached to the other side of said stationary member, said portion including a bore of said predetermined diameter extending longitudinally therethrough as a continuation of said first portion's bore; and a third portion attached to said stationary member between said first and second portions including a bore of said predetermined diameter and means for rotatable supporting said cam means therein.

8. The machine according to claim 7, wherein said cam means comprises a oblong-shaped tube mounted for rotation within the bore formed in said third portion, said square tube upon rotation having a dimension adapted to expand said third portion within said slot wedging said segment axially in place.

9. The machine according to claim 1, further comprising means for interlocking an annular ring of said segments.

10. The machine according to claim 1, further comprising means for interlocking a baffle train of said segments within a respective one of said slots.

11. The machine according to claim 10, wherein said baffle train interlocking means comprises:

a glass spring lock attached to the segment proximate to one end of said slot; and a bayonet rod adapted for insertion through each of the segments in said baffle train, said bayonet rod including an end portion formed to engage said spring lock.

12. In a gas-cooled turbine generator having a plurality of gas zones defined by annular rotating baffles in cooperation with annular stationary baffles, an improved stator baffle assembly for use in forming the annular stationary baffles comprising:

a plurality of baffle segments, each of said segments being adapted for insertion with a stator slot;

means for spacing said segments in a relationship within said slot corresponding to the rotating baffles; and cam means coupled to said segments for locking said segments axially with respect to the rotating baffles.

13. The improved stator baffle assembly according to claim 12, wherein said segments each comprise:

a vane portion; and a wedge portion attached to said vane portion at its bottom.

14. The improved stator baffle assembly according to claim 13, wherein said vane portion further comprises a serrated tip forming a labyrinth seal.

15. The improved stator baffle assembly according to claim 13, wherein said wedge portion includes means for coupling thereto said spacing means.

16. The improved stator baffle assembly according to claim 13, wherein said cam means is rotatably coupled to said wedge portion such that said wedge portion expands within said slot thereby locking it in place.

* * * * *